Aug. 6, 1935. J. KAEFER, JR., ET AL 2,010,491

FRUIT JUICE EXTRACTOR

Filed June 23, 1931

John. Kaefer, Jr
Emil. Albrecht.
BY H. S. Woodward
ATTORNEY.

Patented Aug. 6, 1935

2,010,491

UNITED STATES PATENT OFFICE 2,010,491

FRUIT JUICE EXTRACTOR

John Kaefer, Jr., and Emil Albrecht, Cincinnati, Ohio

Application June 23, 1931, Serial No. 546,406

4 Claims. (Cl. 146—3)

The invention relates to fruit juice extractors, and particularly to devices for extracting the juices of citrus fruits and for like operations, where a fruit or a half-fruit is held manually or otherwise upon a rotating reamer. It is a purpose of the invention to provide an improved mounting for the reamer adapted to use in various forms of bowls and pedestals and to enable utilization of the motor in a novel way.

It is an important aim of the invention to enable the motor to be operated initially without turning the reamer head, but to enable the pressure of the fruit upon the reamer to effect connection with the motor shaft whereby the reamer will be then rotated in the fruit properly. A further important aim is to provide means whereby immediately upon removal of the fruit from the reamer rotation of the reamer will be instantly and quietly stopped. It is also a purpose to enable the embodiment of this invention in a compact form comparing favorably with extractor devices heretofore constructed.

It is also an aim to offer a novel construction in a clutch and brake device especially adapted to the fruit extractor.

Figure 1:
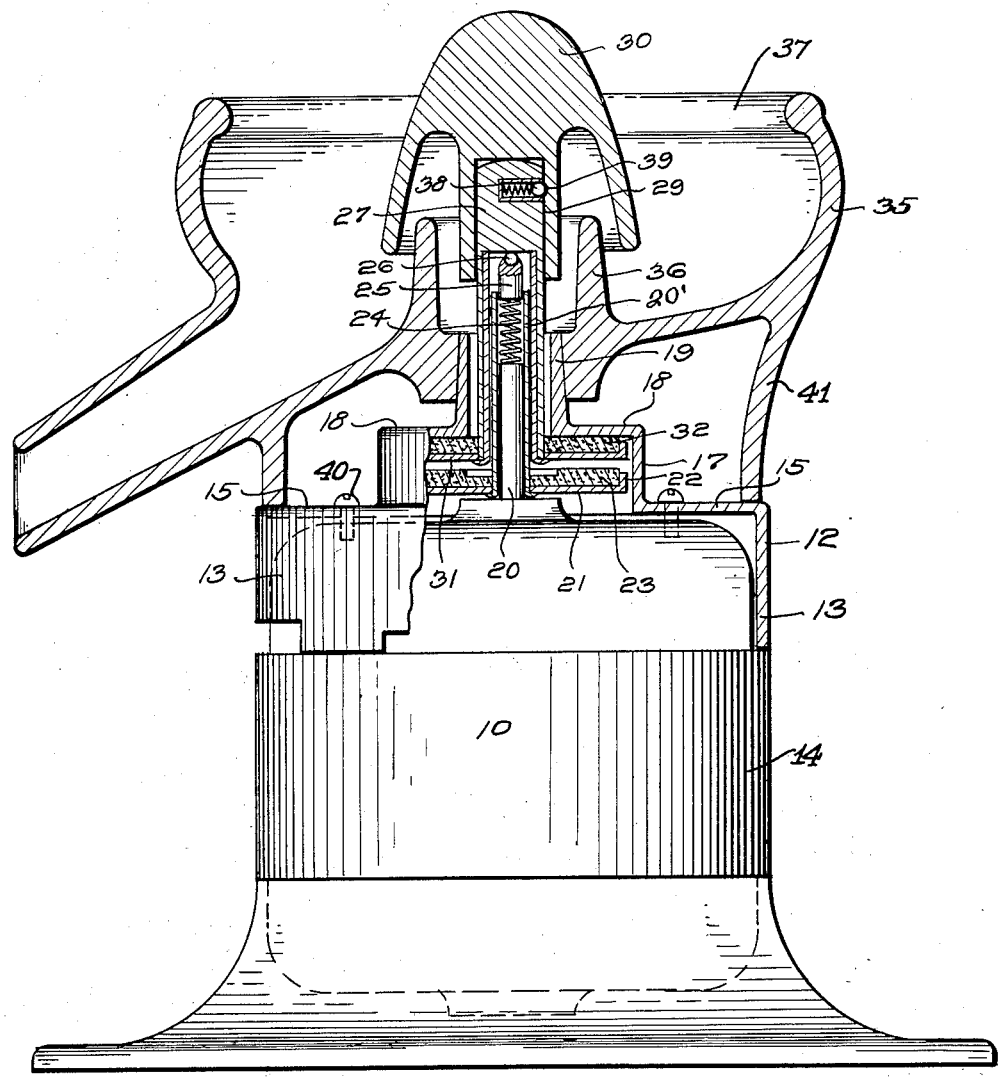
Figure 2:
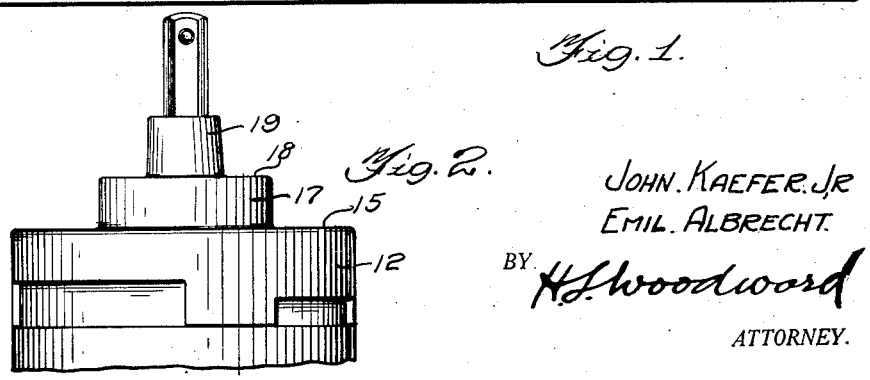

Additional objects, advantages and features of invention reside in the construction, arrangement and combination of parts involved in the embodiment of the invention, as will be understood from the following description and accompanying drawing, wherein Fig. 1 is a vertical section of an extractor constructed in accordance with our invention;

Fig. 2 is an elevation of the upper casing and spindle only, the bowl being removed, and the motor broken away.

There is illustrated an extractor comprising a motor 10 which may be mounted in any approved manner with its shaft on a vertical axis, and extended above the motor casing 11 to a suitable distance for the mounting of the reamer or extractor head as will be described.

It is a practice in machines of this general class to provide over the motor a bowl mounting means where a bowl may be removably mounted over the motor. For that purpose an auxiliary casing piece 12 is shown here, comprising a circular outer wall 13 having a crenelated lower edge, the lower extremities of which are adapted to set upon the upper side of the middle or field piece 14 of the motor. The crenelations provide ventilation for the motor whereby it may be cooled by circulation of air therethrough as is customary. From the top of the wall 13 a horizontal lower bowl rest portion 15 is extended inward, and centrally upon this there is formed integrally a raised circular chamber 17 the flat top 18 of which is provided with an upstanding central tapered sleeve, or bowl support 19 adapted to surround the spindle of the reamer in spaced relation thereto, and serve as a conical upper or elevated bowl rest.

Upon the motor shaft 20 closely over the motor casing, there is fixed a disc 21 having an upturned outer edge flange 22, and set within the flange there is a leather washer or friction facing 23 of a thickness greater than the height of the flange. The disc is carried by a bushing secured by a driving fit on the end of the shaft 20, projecting therebeyond so as to afford a recess constructed as at 20′ to receive a helical spring 24 slidably therein and a slidable seat or plunger 25, having a ball 26 set in the upper end thereof. A bushed spindle 27 is revolubly engaged on the upper end of the shaft 20, its closed upper end resting on the ball 26, whereby it is yieldingly supported. The spindle is exteriorly hexagonal or otherwise adapted to engage slidingly and non-rotatively in the socket 29 at the under side of a reamer or extractor tool or head 30 shown in a conventional form. The lower end of the spindle is provided with a disc 31 similar to the one 21 and having a friction disc 32 therein exposed above the flange of the disc so that it may engage the top portion 18 of the chamber 17 in the casing pedestal piece 12. The spring 24 yieldingly holds the disc 32 against the top 18 so as to prevent rotation of the head 30, but leaving the motor shaft free to rotate with a minimum of friction. The top 18 is at such height that the lower face of the disc 31 is spaced only a fraction of an inch from the friction disc 23 therebelow. The wall 18 of the casing 12 thus serves as a retainer for the spindle, as well as a brake, and the casing 12 and assembly therein comprise an attachable clutch and bowl mounting applicable to ordinary motors to convert them into automatic routers for the purpose indicated and other uses.

The bowl element 35, a fragment of which is shown, is formed with a central raised part 36, in the lower side of which a conical recess is formed adapted to snugly fit the sleeve 19 and be supported thereby. The bowl is provided with an inturned upper portion or lip 37 just a short distance above the lower edge of the head 30. It has been necessary in prior devices to form this lip of the bowl at a much higher level but owing to the function of my machine, the edge of the opening in the bowl may be much lower. The spindle is provided with a ball snap retainer 38 for the head 30, which has a corresponding recess 39 in one side of the socket therein to receive the ball partly. The top casing piece 12 is held to the motor casing by means of screws 40.

The device being assembled, in order to operate it, the power to the motor is supplied and after the machine starts, a half lemon, orange, or the like is pressed upon the tip of the reamer head. The spring 24 is of sufficient strength to cause the head 30 to engage substantially in the fruit pressed thereon before yielding. As soon as the pressure has been sufficiently increased the disc 31 engages the disc 23 and causes rotation of the head. When the lemon is initially engaged with the head before any appreciable amount of juice or pulp is thrown out by centrifugal force it moves into position with the lower edge of the skin or rind below the lip of the bowl 35. This prevents juice from being thrown off at too high a level and the fruit is quickly engaged at the central part of its rind by the extreme top porton of the head 30.

The bowl is formed with an integral skirt or apron 41, the lower edge of which is planiform and rests throughout upon the horizontal lower rest face 15 of the auxiliary casing 12 at the extreme outer part of the latter. This combination of the conical rest 19 and the flat rest 15 without projections enables a very steady support of the bowl without looseness, and by inexpensive finishing of the engaging surfaces of bowl and support.

We claim:—

1. A fruit juice extractor comprising a motor having a shaft extended therefrom, a driving clutch member on the shaft, a stationary brake face member spaced from and opposed to the clutch member, a fruit-engaging head slidable and relatively revoluble on the shaft, a clutch disc fixed with the head and movable therewith between the said driving member and brake member, said head being constructed and adapted to receive fruit thereagainst for extraction of juice by thrust of the fruit longitudinally of the axis of the shaft, resilient means to hold the disc against the brake member and yieldable to pressure of fruit upon the head, whereby when fruit is pressed against the head while the motor is in operation coengagement of the disc and driving and routing of the fruit will occur, and when pressure of the fruit on the head is relieved the disc will disengage from the driving member and coengage the brake member to immediately stop operation of the head independently of the motor.

2. A clutch and mounting for tools of the character described comprising a motor having a casing and a shaft projected therefrom, an auxiliary casing mounted on the motor casing around said shaft and having a concentric circular chamber next the motor casing formed with an annular brake face at the outer part, a concentric driving clutch member on said shaft next the motor casing having a friction clutch face in opposed spaced relation to said brake face, a tubular spindle set slidably and revolubly on the shaft, a protractile spring confined between the spindle and shaft under tension tending to thrust the spindle longitudinally outward on the shaft, said spindle having a driven clutch member fixed thereon movable therewith between the brake face and driving member, and having a friction face on its outer side, and a work engaging head on the spindle, said spring being adapted to hold the driven member against said brake face normally and being yieldable to work whereby pressure of work upon the head will engage the driving and driven members.

3. A clutch attachment for motors comprising a motor having a driving shaft, a case section adapted to be mounted on a motor around the motor shaft, and having a circular chamber concentric with the axis of the shaft and an inward stop and brake face extended inwardly toward said axis, a driving clutch member for a motor shaft having an outer friction face a driven clutch member adapted to be slidably and revolubly mounted on the shaft reciprocable between the driving member and brake face, resilient means to hold the driven member yieldingly against the brake face, a work head and means to connect the work head to the driven member for movement longitudinally with the driven member.

4. The structure of claim 3 in which said clutch members are discs having bounding flanges, and friction facings set therein of a thickness greater than the heights of the flanges.

JOHN KAEFER, Jr.
EMIL ALBRECHT.